United States Patent
Okuyama

(10) Patent No.: US 6,663,051 B2
(45) Date of Patent: Dec. 16, 2003

(54) THERMAL PROTECTION STRUCTURE

(75) Inventor: Keiichi Okuyama, Gifu (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/097,276

(22) Filed: Mar. 15, 2002

(65) Prior Publication Data

US 2003/0025040 A1 Feb. 6, 2003

(30) Foreign Application Priority Data

Aug. 6, 2001 (JP) ........................................ 2001-238383

(51) Int. Cl.[7] ................................................ B64G 1/00
(52) U.S. Cl. .................... 244/158 A; 428/103; 428/105; 428/109
(58) Field of Search ..................... 244/158 A; 428/98, 428/103, 105, 107, 109

(56) References Cited

U.S. PATENT DOCUMENTS

| | | | |
|---|---|---|---|
| 4,338,368 A | * | 7/1982 | Dotts et al. |
| 4,632,865 A | | 12/1986 | Tzur ........................ 428/304.4 |
| 4,755,422 A | | 7/1988 | Headrick et al. ............ 428/256 |
| 4,767,656 A | * | 8/1988 | Chee et al. |
| 5,038,693 A | * | 8/1991 | Kourtides et al. |
| 5,178,922 A | * | 1/1993 | Ferrier et al. |
| 5,560,569 A | * | 10/1996 | Schmidt |
| 5,688,577 A | * | 11/1997 | Smith et al. |
| 6,013,361 A | * | 1/2000 | Seal et al. |
| 6,450,450 B1 | * | 9/2002 | MacDonald et al. |

* cited by examiner

Primary Examiner—J. Woodrow Eldred
(74) Attorney, Agent, or Firm—Oliff & Berridge, PLC

(57) ABSTRACT

A thermal protection structure includes a thermal protection layer formed by impregnating reinforcing fibers with a matrix resin, a gas-pervious wear-resistant layer formed of a heat-resistant material and laminated on the outer surface to be exposed to heat of the thermal protection layer. The wear-resistant layer prevents the direct impact of raindrops or ice pellets on the thermal protection layer, so that the reduction of the thermal protection ability of the thermal protection layer due to wear can be prevented. The gas-pervious wear-resistant layer permits the emission of gases produced by the thermal decomposition and carbonization of the thermal protection layer caused by aerodynamic heating into the environment.

9 Claims, 1 Drawing Sheet

THERMAL PROTECTION STRUCTURE

BACKGROUND OF THE INVENTION

1. Field of the Invention

The present invention relates to a thermal protection structure suitable for forming a fairing for a rocket that flies through the earth's atmosphere, undergoing aerodynamic heating, or for forming an airframe for a spacecraft, such as a self-contained space capsule for a spacecraft system that is launched into the exoatmosphere, reenters the earth's atmosphere and is recovered.

2. Description of the Related Art

The outer surface of the airframe of a space vehicle, such as a rocket that flies through the atmosphere or a self-contained capsule that reenters the earth's atmosphere, is exposed to an intense aerodynamic heating environment created by the impact and adiabatic compression of air molecules on the outer surface of the airframe. The outer surface of the airframe is covered with a thermal protection material to insulate the interior of the airframe from heat generated by aerodynamic heating. Such a thermal protecting material is called ablator. Typically, the ablator is a fiber-reinforced compound material, such as a carbon-fiber-reinforced plastic (CFRP) obtained by impregnating a reinforcing material formed of carbon fibers with a matrix resin, such as a phenolic resin. The CFRP is capable of withstanding heating at a high heating rate on the order of 15 MW/m$^2$ which occurs when a space vehicle flying along a planetary orbit reenters the earth's atmosphere.

The outer surface of the fairing of a space vehicle, such as a rocket or a reentry body, is subject to the detrimental action of raindrops and ice pellets causing erosion. Therefore the outer surface of the fairing must be resistant to such an erosive action and must be sufficiently resistant to aerodynamic heating. The fairing must be lightweight to increase the final velocity of the space vehicle. Therefore, it is desired to enhance the resistance of the fairing to aerodynamic heating without increasing the weight thereof. A thermal protection structure satisfying those requirements has been desired.

SUMMARY OF THE INVENTION

Accordingly, it is an object of the present invention to provide a lightweight thermal protection structure highly resistant to the erosive action of raindrops and the like and to aerodynamic heating.

According to one aspect of the present invention, a thermal protection structure comprises: a thermal protection layer formed by impregnating reinforcing fibers with a matrix resin; and a wear-resistant layer formed of a gas-pervious heat-resistant material and laminated on an outer surface to be exposed to heat of the thermal protection layer.

The wear-resistant layer covering the outer surface of the thermal protection layer prevents the direct impact of raindrops or ice pellets on the thermal protection layer, so that the reduction of the thermal protection ability of the thermal protection layer due to wear can be prevented. The gas-pervious wear-resistant layer permits the emission of gases produced by the thermal decomposition and carbonization of the thermal protection layer caused by aerodynamic heating into the environment.

Since the emission of the gases produced by thermal decomposition entails heat dissipation, cooling effect of heat transfer is available. The emission of the gases produced by thermal decomposition provides heat-insulating effect. The thermal decomposition of the thermal protection layer has endothermic effect. The endothermic effect, the cooling effect and the heat-insulating effect contribute to the improvement of the resistance to aerodynamic heating of the thermal protection structure. Since wear-resistant layer prevents the wear of the interior of the wear-resistant layer and the thermal protection layer, the thermal protection structure can ensure the high reliability of the fairing of the vehicle flying in the atmosphere.

Preferably, the thermal protection layer includes an outer fiber layer formed by impregnating the reinforcing fibers of short fibers extending in directions in a two-dimensional plane perpendicular to thickness of the thermal protection layer with a matrix resin.

The gases produced by the thermal decomposition of the matrix resin is able to permeate easily the thermal protection layer including the outer fiber layer of the reinforcing short fibers extending in directions in a two-dimensional plane perpendicular to the thickness of the thermal protection layer. The effect of heat absorption, heat dissipation and heat insulation by the gases produced by thermal decomposition provides the thermal protection structure with high thermal protection ability.

Preferably, the thermal protection layer further includes an inner fiber layer laminated on an inner surface of the outer fiber layer, the inner fiber layer being formed by impregnating the reinforcing fibers of long fibers which are longer than the short fibers with a matrix resin, the long fibers extending in directions in a two-dimensional plane perpendicular to thickness of the thermal protection layer.

The inner fiber layer formed on the inner surface of the outer fiber layer and including the reinforcing long fibers extending in directions in a two-dimensional plane enhances the mechanical strength of the thermal protection layer.

Preferably, the thermal protection structure further includes a heat-insulating layer covering an inner surface of the inner fiber layer and a metal coat layer covering an inner surface of the heat-insulating layer.

The heat-insulating layer covering the inner surface of the inner fiber layer further enhances heat-insulation to reduce thermal influence on equipment installed in the vehicle. The metal coat layer enhances the mechanical strength of the thermal protection structure and prevents the deformation and warping of the thermal protection structure due to thermal stress. The heat-insulating layer and the metal coat layer prevent the leakage of the gases produced by thermal decomposition into the vehicles. The metal coat layer changes the radiation rate of an inner surface facing an interior of the vehicle so as to improve thermal control. Thermal control reduces heat transfer from the high-temperature metal coat layer to the equipment installed in the vehicle by holding the radiation rate of the inner surface of the metal coat layer at a low level.

Preferably, the outer fiber layer is formed by randomly attaching prepreg pieces including the short fibers to an inner surface of a mold into a layer and hot-pressing the layer of the prepreg pieces.

Preferably, the inner fiber layer is formed by superposing prepregs including the long fibers in a plurality of layers an the inner surface of the outer fiber layer so that the long fibers in at least one layer of the prepregs extend in a direction different from a direction of the long fibers in another layer of the prepregs and heating the prepregs which are superposed.

Preferably, the thermal protection structure is used for forming a fairing of a rocket.

According to another aspect of the present invention, a thermal protection structure comprises: a base layer formed by impregnating reinforcing fibers with a matrix resin; and a surface layer formed of a porous material and laminated on an outer surface to be exposed to heat of the base layer.

Gases produced by the thermal decomposition of the base layer can be emitted through the surface layer of a porous material. The effect of heat absorption by the production of the gases, heat dissipation by the flow of the gases through the surface layer, and heat insulation by the gases emitted from the outer surface of the surface layer provides the thermal protection structure with high thermal protection ability.

Preferably, the thermal protection structure is used for forming an outer wall of a space vehicle which is designed to reenter an earth's atmosphere from an outer space.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
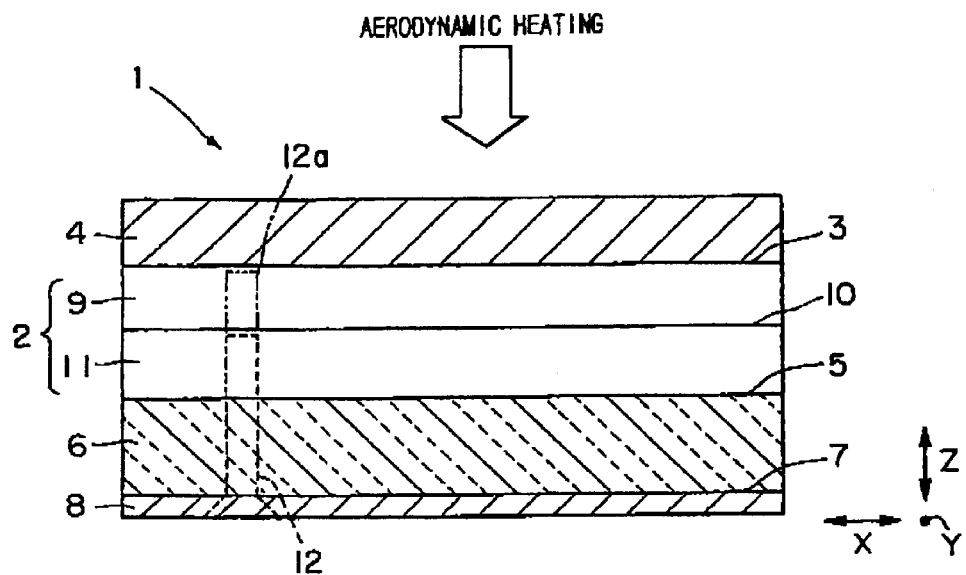
FIG. 1 is a fragmentary sectional view of a thermal protection structure in a first embodiment according to the present invention.

Referring to FIG. 1, a thermal protection structure 1 in a first embodiment according to the present invention includes a thermal protection layer 2 formed by impregnating reinforcing fibers with a matrix resin, a gas-pervious wear-resistant layer 4 resistant to the erosive action of rain, formed of a heat-resistant material and laminated on the outer surface 3 to be exposed to heat of the thermal protection layer 2, an heat-insulating layer 6 attached to the inner surface 5 of the thermal protection layer 2 with an adhesive, and a metal coat layer 8 coating the inner surface 7 of the heat-insulating layer 6.

The thermal protection structure 1 is used for forming a fairing of a rocket. The rocket provided with the fairing formed by the thermal protection structure 1 can be launched in the stormy weather because the wear-resistant layer 4 forming the outermost layer of the thermal protection structure 1 is resistant to rain-erosion. The wear-resistant layer 4 is formed over the outer surface of the thermal protection layer 2 through the thermal spraying or adhesive bonding of a heat-resistant ceramic material, a heat-resistant metal or a heat-resistant resin. The wear-resistant layer 4 is formed in a porous structure to permit the outward emission of gases produced by the thermal decomposition of the thermal protection layer 2. The outer surface 3 of the thermal protection layer 2 has fine irregularities which exercise a mechanical anchoring function, enhance adhesion between the thermal protection layer 2 and the wear-resistant layer 4, and prevents the separation of the wear-resistant layer 4 from the thermal protection layer 2 by heat applied to the wear-resistant layer 4.

If it is expected that the porous wear-resistant layer 4 formed of the heat-resistant ceramic material, the heat-resistant metal or the heat-resistant resin is destroyed by thermal shocks due to the sharp change of aerodynamic heating rate, a honeycomb layer is formed on the outer surface of the thermal protection layer 2 to be used as the wear-resistant layer 4. The thermal protection layer 2 and the honeycomb layer are formed of the same material to prevent the separation thereof due to thermal stress induced therein. Cavities in the honeycomb layer are filled with a porous heat-resistant ceramic material, a porous heat-resistant metal or a porous heat-resistant resin.

The thermal protection layer 2 includes an outer fiber layer 9 formed by impregnating reinforcing short fibers extending in directions in a two-dimensional plane, i.e., X–Y plane, perpendicular to a direction Z parallel to the thickness of the thermal protection layer 2 with a matrix resin, and an inner fiber layer 11 formed on the inner surface 10 of the outer fiber layer 9 by impregnating reinforcing long fibers which are longer than the reinforcing short fibers and extending in directions in a two-dimensional plane with a matrix resin.

A preform for forming the outer fiber layer 9 is formed by cutting a prepreg into rectangular prepreg pieces of a predetermined size, such as about 1 cm in width and about 4 cm in length, randomly attaching the rectangular prepreg pieces to the inner surface of a mold in a layer of, for example, 3 mm in thickness, and hot-pressing the layer of the rectangular prepreg pieces. Thus, reinforcing short fibers extend randomly in directions in a two-dimensional plane in the preform for forming the outer fiber layer 9.

The prepreg is a flexible sheet formed by impregnating continuous reinforcing filaments extending in perpendicular directions in a plane with a matrix resin. Although this embodiment employs carbon fibers as the reinforcing fibers, silica glass fibers may be used as the reinforcing fibers. Although this embodiment uses a phenolic resin as the matrix resin, a silicone resin or an epoxy resin may be used instead of the phenolic resin.

The inner fiber layer 11 is formed by superposing the aforesaid prepregs in a plurality of layers on the inner surface 10 of the outer fiber layer 9. A first prepreg layer is formed by applying the prepregs uniformly in a close arrangement to the inner surface 10 of the outer fiber layer 9 so that the fibers thereof extend in the same direction. A second prepreg layer is formed by applying the prepregs to the first layer so that the fibers thereof extend at a predetermined angle of, for example, 45 degrees to the fibers of the prepregs forming the first layer. Prepreg layers in which the fibers of the prepregs extend in parallel to those of the prepregs forming the first prepreg layer, and prepreg layers in which the fibers of the prepregs extend in parallel to those of the prepreg forming the second prepreg layer are superposed alternately to form a prepreg laminate, i.e., a preform for forming the inner fiber layer 11.

The preform for forming the outer fiber layer 9 is superposed on the preform for forming the inner fiber layer 11 to form a preform layer, and the preform layer is heated in a vacuum for molding in an autoclave to form the thermal protection layer 2.

The heat-insulating layer 6 is bonded to the inner surface 5 of the thermal protection layer 2, the wear-resistant layer 4 is formed on the outer surface 3 of the thermal protection layer 2, and the metal coat layer 8 is formed on the inner surface 7 of the heat-insulating layer 6 to complete the thermal protection structure 1. Load is transferred from the thermal protection layer 2 to the metal coat layer 8 and vice versa through a plurality of fasteners 12. Practically, the fasteners 12 are machine screws or bolts of a heat-resistant metal, such as molybdenum, or a carbon/carbon composite (C/C). The fasteners 12 are passed through holes formed in the metal coat layer 8 and are screwed in threaded holes formed in the heat-insulating layer 6 and the inner fiber layer 11. The fasteners 12 may be any suitable machine screws or bolts, such as flat head machine screws as shown in FIG. 1, oval head machine screws or hexagon head bolts.

In a modification of the thermal protection structure 1 in the first embodiment, the metal coat layer 8 may be fastened to the thermal protection layer 2 by passing fasteners 12a indicated by imaginary lines in FIG. 1 through holes formed in the metal coat layer 8 and screwing the same in threaded holes formed in the inner fiber layer 11 and the outer fiber layer 9. Thus, the fasteners 12a are able to fasten the metal coat layer 8 more firmly to the thermal protection layer 2.

Since the wear-resistant layer 4 is formed on the outer surface 3 of the thermal protection layer 2 of the thermal protection structure 1, a rocket having a fairing coated with the thermal protection structure 1 can be launched even in the stormy weather because the wear-resistant layer 4 prevents the direct impact of raindrops or ice pellets on the thermal protection layer 2 and prevents the reduction of the thermal protection ability of the thermal protection layer 2 due to wear. The gas-pervious wear-resistant layer 4 permits the emission of gases produced by the thermal decomposition and carbonization of the thermal protection layer 2 caused by aerodynamic heating therethrough into the environment.

Since the emission of the gases produced by thermal decomposition of the thermal protection layer 2 entails heat dissipation, cooling effect of heat transfer is available. The thermal decomposition of the thermal protection layer 2 has endothermic effect. The endothermic effect, the cooling effect and the heat-insulating effect contribute to the improvement of the resistance to aerodynamic heating of the thermal protection structure 1.

Since wear-resistant layer 4 prevents the wear of the interior of the wear-resistant layer 4 and the thermal protection layer 2, the thermal protection structure 1 ensures the high reliability of the fairing of the vehicle flying in the atmosphere.

Since the thermal protection layer 2 has the outer fiber layer 9 in which the short reinforcing fibers extend in directions in a plane perpendicular to the direction Z parallel to the thickness of the outer fiber layer 9, gases produced by the thermal decomposition of the matrix resin is able to permeate easily the thermal protection layer 2. The effect of heat absorption, heat dissipation and heat insulation by the gases produced by thermal decomposition provides the thermal protection structure 1 with high thermal protection ability.

Although gases produced by the carbonization of the inner fiber layer 11 by heat has difficulty in passing the inner fiber layer 11 because the inner fiber layer 11 is formed on the inner surface 10 of the outer fiber layer 9, the reinforcing long fibers provide the thermal protection structure 1 with high mechanical strength. Thus, the thermal protection structure 1 provided with the inner fiber layer 11 in addition to the wear-resistant layer 4 and the inner fiber layer 9 has a high mechanical strength.

The metal coat layer 8 covering the inner surface 7 of the heat-insulating layer 6 further enhances the mechanical strength of the thermal protection structure 1 and prevents the warping of the thermal protection structure 1 due to thermal stress induced therein.

Figure 2:
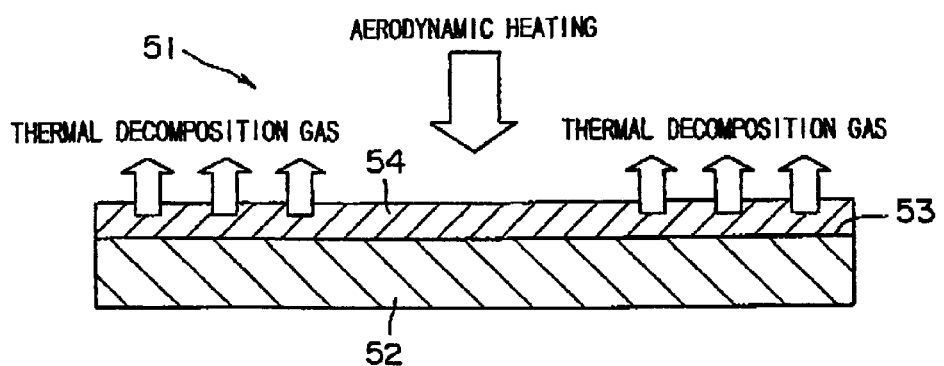
FIG. 2 is a fragmentary sectional view of a thermal protection structure in a second embodiment according to the present invention.

Referring to FIG. 2 showing a thermal protection structure 51 in a second embodiment according to the present invention in a fragmentary sectional view, the thermal protection structure 51 has a base layer 52 formed by impregnating reinforcing fibers with a matrix resin, and a porous surface layer 54 and laminated on the outer surface 53 of the base layer 52. The surface layer 54 is formed of any one of porous ceramic materials, porous metals and porous synthetic resins.

The base layer 52 may be the same in construction as the outer fiber layer 9, the inner fiber layer 11, or the thermal protection layer 2 consisting of the outer fiber layer 9 and the inner fiber layer 11 of the thermal protection structure 1 shown in FIG. 1.

The thermal protection structure 51 is used for forming outer walls of a space vehicle, such as a self-contained space capsule for a spacecraft system, that is launched into the outer space, reenters the earth's atmosphere and is recovered.

The porous surface layer 54 similar to the wear-resistant layer 4 shown in FIG. 1 and formed on the outer surface 53 of the base layer 52 permits gases produced by the thermal decomposition of the base layer 52 by heat to flow therethrough. Thus, the endothermic effect, the cooling effect and the heat-insulating effect of the gases produced by the thermal decomposition of the base layer 52 contribute to the improvement of the thermal protection ability of the lightweight thermal protection structure 51.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A thermal protection structure, comprising:
   a thermal protection layer formed by impregnating reinforcing fibers with a matrix resin; and
   a wear-resistant layer formed of a gas-pervious heat-resistant material and laminated on an outer surface to be exposed to heat of the thermal protection layer.

2. The thermal protection structure according to claim 1, wherein the thermal protection layer includes an outer fiber layer formed by impregnating reinforcing fibers of short fibers extending in directions in a two-dimensional plane perpendicular to thickness of the thermal protection layer with a matrix resin.

3. The thermal protection structure according to claim 2, wherein the thermal protection layer further includes an inner fiber layer laminated on an inner surface of the outer fiber layer, the inner fiber layer being formed by impregnating reinforcing fibers of long fibers which are longer than the short fibers with a matrix resin, the long fibers extending in directions in a two-dimensional plane perpendicular to thickness of the thermal protection layer.

4. The thermal protection structure according to claim 3, further including a heat-insulating layer covering an inner surface of the inner fiber layer and a metal coat layer covering an inner surface of the heat-insulating layer.

5. The thermal protection structure according to claim 2, wherein the outer fiber layer is formed by randomly attaching prepreg pieces including the short fibers to an inner surface of a mold into a layer and hot-pressing the layer of the prepreg pieces.

6. The thermal protection structure according to claim 3, wherein the inner fiber layer is formed by superposing prepregs including the long fibers in a plurality of layers on the inner surface of the outer fiber layer so that the long fibers in at least one layer of the prepregs extend in a direction different from a direction of the long fibers in another layer of the prepregs and heating the prepregs which are superposed.

7. The thermal protection structure according to claim 1, wherein the thermal protection structure is used for forming a fairing of a rocket.

8. A thermal protection structure, comprising:

a base layer formed by impregnating reinforcing fibers with a matrix resin; and a surface layer formed of a porous material and laminated on an outer surface to be exposed to heat of the base layer.

9. The thermal protection structure according to claim 8, wherein the thermal protection structure is used for forming an outer wall of a space vehicle which is designed to reenter an earth's atmosphere from an outer space.

* * * * *